United States Patent
Männer (10) Patent No.: US 7,322,817 B2
(45) Date of Patent: Jan. 29, 2008

(54) INJECTION MOLDING NOZZLE FOR PLASTIC WITH AT LEAST TWO OUTLET OPENINGS

(75) Inventor: Hans-Peter Männer, Bahlingen (DE)

(73) Assignee: Otto Manner Innovation GmbH, Bahlingen (DE)

( * ) Notice: Subject to any disclaimer, the term of this patent is extended or adjusted under 35 U.S.C. 154(b) by 266 days.

(21) Appl. No.: 10/616,824

(22) Filed: Jul. 10, 2003

(65) Prior Publication Data

US 2004/0009259 A1   Jan. 15, 2004

(30) Foreign Application Priority Data

Jul. 10, 2002  (DE) ................................ 102 31 093

(51) Int. Cl.
  *B29C 45/00*  (2006.01)
(52) U.S. Cl. ...................... 425/562; 425/563; 425/568; 425/572
(58) Field of Classification Search ................ 425/549, 425/562, 564, 565, 566, 568, 572, 563
  See application file for complete search history.

(56) References Cited

U.S. PATENT DOCUMENTS

| | | | | |
|---|---|---|---|---|
| 2,471,683 A | * | 5/1949 | Halbach | ..................... 425/547 |
| 4,304,544 A | * | 12/1981 | Crandell | ..................... 425/549 |
| 4,662,837 A | * | 5/1987 | Anderson | ..................... 425/548 |
| 4,981,431 A | | 1/1991 | Schmidt | |
| 5,368,470 A | * | 11/1994 | Manner | ..................... 425/564 |
| 6,162,044 A | * | 12/2000 | Babin | ......................... 425/562 |
| 6,755,641 B1 | * | 6/2004 | Nakanishi | ................... 425/566 |

FOREIGN PATENT DOCUMENTS

| | | |
|---|---|---|
| DE | 100 08 471 A1 | 8/2001 |
| EP | 0186413 | 7/1986 |
| EP | 0407971 | 1/1991 |
| EP | 0447573 | 9/1991 |
| JP | 11277573 | 10/1999 |

* cited by examiner

*Primary Examiner*—Yogendra N. Gupta
*Assistant Examiner*—Maria Veronica Ewald
(74) *Attorney, Agent, or Firm*—Volpe and Koenig PC (57) ABSTRACT

An injection molding nozzle (1) for plastic with at least two outlet openings (2) facing toward different sides and directed oppositely is not constructed as an open injection molding nozzle but has a respective closure needle (5) in the outlet openings (2), and a drive is also provided for displacing the closure needles (5) at least into the closing position. Thus a cold plug at the end of the outlet openings (2) facing a mold (3) can be avoided, independently of whether the closure needles completely close these outlet openings (2) at their mouth (6) or still leave a minimum gap.

21 Claims, 9 Drawing Sheets

SCHNITT A-A

Fig. 1

SCHNITT A-A

SCHNITT A-A

Fig. 9 SCHNITT B-B

Fig. 10 SCHNITT A-A

Fig. 11

INJECTION MOLDING NOZZLE FOR PLASTIC WITH AT LEAST TWO OUTLET OPENINGS

BACKGROUND

The invention relates to an injection molding nozzle for plastic with at least two outlet openings in its end region, directed toward different sides, for supply to different sprue openings and with a feed channel for directing the plastic to the outlet openings.

Such injection molding nozzles are known in practice and as a rule have at least two or four outlet openings, directed radially to the side, in order for example to be able to injection mold several cylindrical plastic parts simultaneously. After the injection process, the plastic situated in the outlet opening has to cool and thus forms a cold plug. With the next injection molding process, this cold plug has to be forwarded by injection pressure into the mold, which takes place at different times at the mouths of the outlet openings and can lead to differences of filling. Furthermore, the injection molded parts are initially connected to the sprue and to the plastic situated in the nozzle, and have to be torn off therefrom, leading to an unattractive sprue and even to damage to the molded parts.

SUMMARY

The invention therefore has as its object to provide an injection molding nozzle of the kind noted at the beginning, with at least two delivery openings, in which a uniform filling of the different molds can be attained and the removal of the injection molded parts can be simplified and with this the risk of damage to the molded parts is reduced or avoided.

To attain this object, the above-described injection molding nozzle is characterized in that the outlet openings directed toward different sides respectively have a needle closure with a closure needle adjustable in a direction of the outlet opening, and also a drive for displacing the closure needle into its closed position.

Instead of the heretofore known substantially open injection molding nozzles with several outlet openings, these outlet openings are thus provided with needle closures, so that after the injection molding process, the outlet openings for the plastic can be closed, and there is thus no longer a connection to the molded part. Also, a cold plug in the mouth region of the outlet openings is avoided, so that a following injection molding process is correspondingly facilitated. In an advantageous manner, through separation of the injection molded parts from the outlet opening by means of the closure needles, there results a very accurate sprue, hardly or not at all detectable, on the injection molded part.

The injection molding nozzle can have an individual plastic feed channel for each lateral outlet opening provided with a closure needle, and these feed channels can be arranged outside the middle of the injection molding nozzle. Thus each outlet opening can be fed with plastic independently of the others, and above all the central region of the injection molding nozzle also remains free for a drive, explained below, for the closure needles.

It is favorable for this if the feed channels for the plastic enter the outlet openings near the ends of the individual closure needles in front of the mouths of the outlet openings. The plastic can thus be introduced as close as possible to the mouth of the outlet opening into this, and simultaneously used to act with the injection pressure on the closure needle against its closing movement, in order to support or perform the opening movement.

It is favorable if the outlet openings and the closure needles displaceable in them are arranged about radially and in particular in the same plane that extends perpendicular to the longitudinal mid-axis of the injection molding nozzle. Defined sprue locations result thereby, and above all a common actuation of the closure needles is facilitated.

A particularly advantageous embodiment of the invention can be provided in that the closure needles of the outlet openings have a common drive at least for displacement into their closing positions. Since these closure needles are arranged radially, their ends remote from the mouth of the outlet openings are situated relatively close together, so that the use of a common drive is easily possible, with a corresponding simplification of the whole mechanism. The drive for displacement into the closing position is above all important, while the injection pressure can be used in a manner known per se for the opposite displacement movement of the closure needles.

The closure needles can have, seen in the closing direction, and in front of the opening of the feed channel for plastic, a cross sectional enlargement or a shoulder or the like as an action surface for the injection molding pressure for opening the closure needle, and the drive effective in the closing direction can be switched off and/or overcome during the opening of the respective closure needle. Through the use of such a cross sectional enlargement, a correspondingly large force can be produced for opening the respective closure needle during a new injection cycle.

For displacing the closure needles into the closing position, compression springs and/or displacement means engaging mechanically on the closure needles, particularly at their ends remote from the outlet opening, can be provided. Mechanical displacement means have here the advantage over compression springs that during the opening of the needle they are brought into a position which produces no counter-pressure like that of a compression spring.

For a simple mechanical arrangement with the fewest possible parts, it is favorable if a common drive element is provided to displace several or all closure needles in the closing direction, and if this drive element is a displacement body having different cross sections and movable between the ends of the closure members, for example, a cone, conical member, or the like tapering element or a cam disk or eccentric disk or the like. Thus either a cone or a conical member can be pushed in deeper between the ends of the closure needles, whereby these ends, and with them the closure needles, are displaced into the closure position. However, a rotary element can also be provided between these ends that has an increasing diameter in the peripheral direction, then decreasing again in the contrary direction or on further turning, so that by means of this rotary movement the ends of the closure needles can be pushed apart and thus the closure needles can be pushed into their closing position.

For displacing a conical or cone body, a push/pull rod can be provided centrally in the axial direction within the injection molding nozzle, or a rotary rod can be provided arranged centrally in the injection molding nozzle for rotating a cam disk or eccentric disk. Thus a single rod is sufficient to mechanically act on the plural closure needles so that they are displaced in the closing position, and this rod can be arranged at right angles to the movement of the closure needles and also at right angles to their longitudinal extent, and thus at its end a spindle drive can in turn easily be provided or coupled with a corresponding rotary or axial drive, in particular a piston.

A further embodiment of the invention, and in particular of the actuation of the closure needles, can be provided in that the drive element engaging the closure needles is coupled and connected to these such that the one movement acts to close the closure needles, and the opposite movement to pull them back into their opening position. For example, a conical displacement member could engage the needle ends with corresponding opposite hooks and guides between the needle ends, so that also upon pulling back this cone member, due to the positive connection with the needle ends, these are then pulled back again into the opening position.

An embodiment of the invention of quite considerably advantageous importance is provided in that the housing of the injection molding nozzle is divided transversely of the feed channels for the plastic, and has a heat compensation gap in a region of the division. It can thereby be attained that the thermal movements arising due to the hot injection molding material are kept far from the closure needles and their mounting places, and thus the mouths of the outlet openings and the closure needles maintain their position accurately in spite of the thermal movements. Nevertheless, the nozzle housing can accommodate the thermal expansions and thermal movements which arise.

It is advantageous if the thermal compensation gap on the housing is sealed, at least in the region of the feed channels for the plastic, by an overlapping or the like. It is thereby ensured that no injection molding material can emerge in the region of the thermal compensation gap and block later thermal movements.

For example, the overlapping for sealing the thermal compensation gap in the region of the feed channel can be formed by sliding sleeves, in particular a sliding sleeve arranged respectively on the inside or outside of the feed channel. The thermal compensation movements of the housing of the injection molding nozzle are thereby possible unhindered, without the injection molding material being able to reach the thermal compensation gap.

A constructionally favorable arrangement results when the outlet openings and the closure needles displaceable therein are arranged inserted, and if necessary interchangeable, in the housing of the injection molding nozzle. This facilitates mounting and possible exchange of the closure needles.

The closure needles can thereby be respectively axially insertable into their mounting position and can be fixed by a retaining cap which can be screwed onto the outside of the housing and which includes the mouth of the outlet opening. For interchange of the needle, this retaining cap needs only to be unscrewed again, in order to be able to pull the closure needle out. These retaining caps themselves which have the mouth of the outlet opening can correspondingly be easily exchanged.

It is however also or additionally possible that the closure needles in the sleeve receiving them can be pushed in from the later inside out before being inserted into the nozzle member, and can be fixed in the axial direction by means of a shoulder, a cross sectional enlargement or the like, such that the displacement movement is limited to the closing direction and the closure needle is delimited in the radial direction. The diameter enlargement, which can also convert the injection molding pressure into an opening movement of the closure needle, can thereby perform a double function.

According to the dimensions of the whole injection molding nozzle and according to the particular application, more than two outlet openings with closure needles displaceable therein can be arranged on the same nozzle housing, particularly in the same plane, and can be movable into the closing position with the same drive element.

In sum, by the combination of individual or several of the above-described features and measures, there results an injection molding nozzle with plural outlet openings directed radially sideways, with which a cold plug in these outlet openings, with the disadvantages connected therewith, can be avoided.

BRIEF DESCRIPTION OF THE DRAWINGS

Exemplary embodiments of the invention are described in detail hereinafter. In the partially schematized drawing.

DETAILED DESCRIPTION GO THE PREFERERED EMBODIMENTS

In the embodiments and examples described hereinafter, parts which are similar or corresponding in their function, even when given modified forms, have been identified with corresponding reference numerals.

An injection molding nozzle for plastic, denoted generally by 1, has at least two outlet openings 2 directed toward different sides in its end region, for acting on different sprue openings on different molds 3, of which only a respective one is shown in FIGS. 1-11. In all the Figures there can however be seen, besides the outlet opening 2 which leads and is directed to the mold 3 shown, the oppositely directed further outlet opening 2, with which a further mold can be and is to be supplied.

This injection molding nozzle 1 contains, in a manner yet to be described, a feed channel 4 for the plastic to the outlet openings 2.

It is provided in all the embodiments that the outlet openings 2 directed to different sides respectively have a needle closure with a closure needle 5 displaceable in the direction of the outlet opening 2, a drive, described below, being provided for displacing the closure needle 5 at least into its closing position.

According to FIGS. 2-11, the injection molding nozzle 1 has, for each outlet opening 2 directed laterally with respect to the longitudinal extent of the whole injection molding nozzle 1 and provided with a closure needle 5, its own feed channel 4 for the plastic, and the plurality of feed channels 4 provided corresponding to the number of closure needles 5 and outlet openings 2 are situated outside the middle of the whole injection molding nozzle 1, so that this middle remains in an advantageous manner free for elements, yet to be described, of the drive for the closure needles 5.

In all the exemplary embodiments, it is also provided that the feed channels 4 for the plastic to enter the outlet openings 2 are located before the mouths 6, close to the ends of the individual closure needles 5. The outlet openings 2 can also be considered as channels in which the closure needles 5 are movable back and forth, and the feed channels 4 enter from the side before the mouths 6 of these channels or outlet openings 2, and have in their end region yet another change of direction, shortly before entering, in the direction toward the mouth 6.

The outlet openings 2 and the closure needles 5 displaceable in them are, according to FIGS. 1, 6, 8, 9 and 11, arranged approximately radially and particularly in the same plane that extends perpendicular to the longitudinal mid-axis of the injection molding nozzle 1, so that they can also be actuated in common. The closure needles 5 have a drive, which can be differently embodied as described below, for displacement at least into their closing position.

The injection molding pressure serves for displacing the closure needles 5 into their opening position, and for this it is provided that the closure needles 5, seen in the closing direction, have before the inlet 7 or the mouth of the feed channel 4 into the outlet opening 2 a cross sectional enlargement in the form of a step or if necessary a shoulder or the like as an action surface for the injection molding pressure for opening the closure needle 5. The drive acting in the closing direction is disconnected or overcome during the opening of the respective closure needle 5. At the beginning of an injection molding process, the closure needles 5 can thus be pushed back out of their closing position by the liquid plastic and its pressure, in that the injection molding pressure engages on the cross sectional enlargement 8 and the corresponding closure needle 5 is pushed back like a piston so that the mouth 6 of the outlet opening 2 is released from the closure needle 5 and its closure end.

If one or more compression springs serve as the drive for closing the closure needles 5, their force is easily overcome by the injection molding pressure. In the exemplary embodiments, however, displacement means yet to be described are provided, which are returned into a corresponding position for this process of displacement of the closure needle 5 into the open position.

In the embodiments shown, a respective common drive element is provided for displacing several or all closure needles 5 in the closing direction, and this drive element is a displacement member having different cross sections and movable between the mutually facing ends of plural closure needles 5.

In exemplary embodiments according to FIGS. 2-5, this displacement member is a cone 9 or conically tapering member or the like, which engages with its first smaller cross section between the ends of the closure needle 5 and by its own axial displacement pushes apart the ends of the closure needles and thereby the needles 5 themselves in the radial direction, so that they simultaneously reach their closing positions. The drawings respectively show this closing position.

Figure 9:
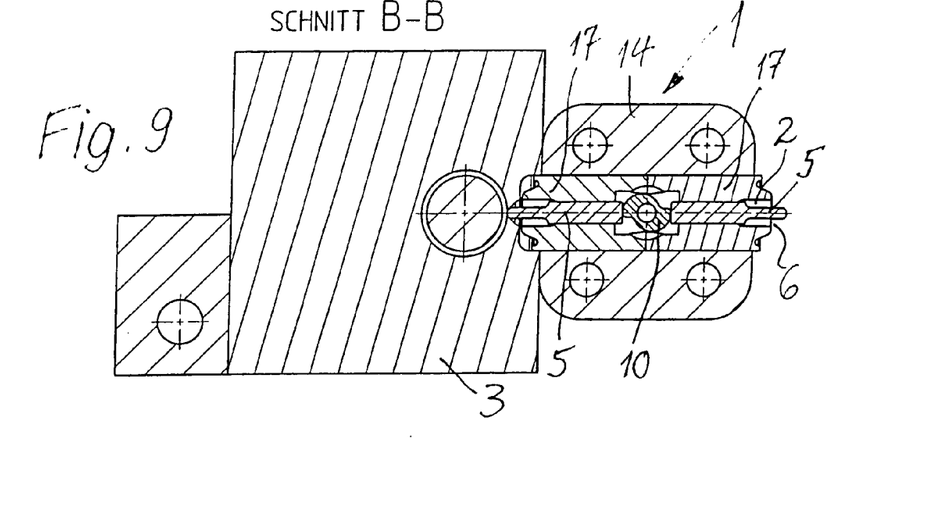
FIG. 9 shows a diagram of an embodiment corresponding to FIG. 6, with a cam disk between the ends of the closure needles, the mouth to be opened or partially closed by the needles being machined into the mold.
Figure 10:
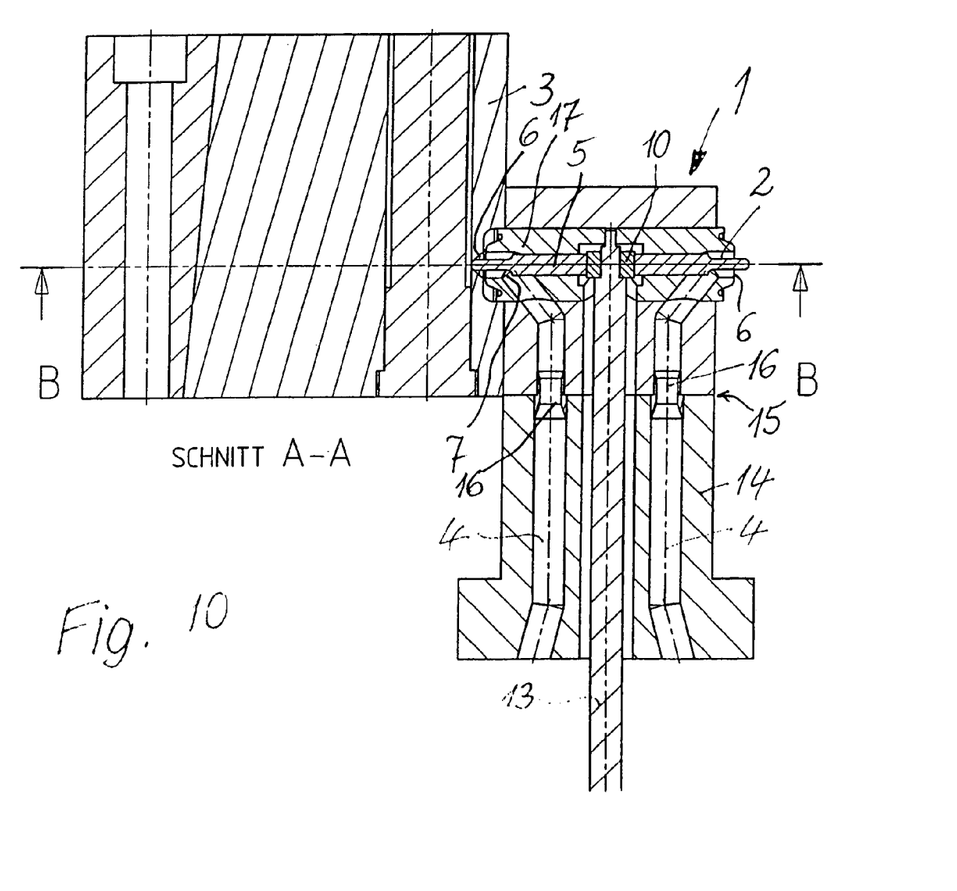
FIG. 10 shows a section along the line A-A in FIG. 1 in an embodiment according to FIG. 9.
Figure 11:
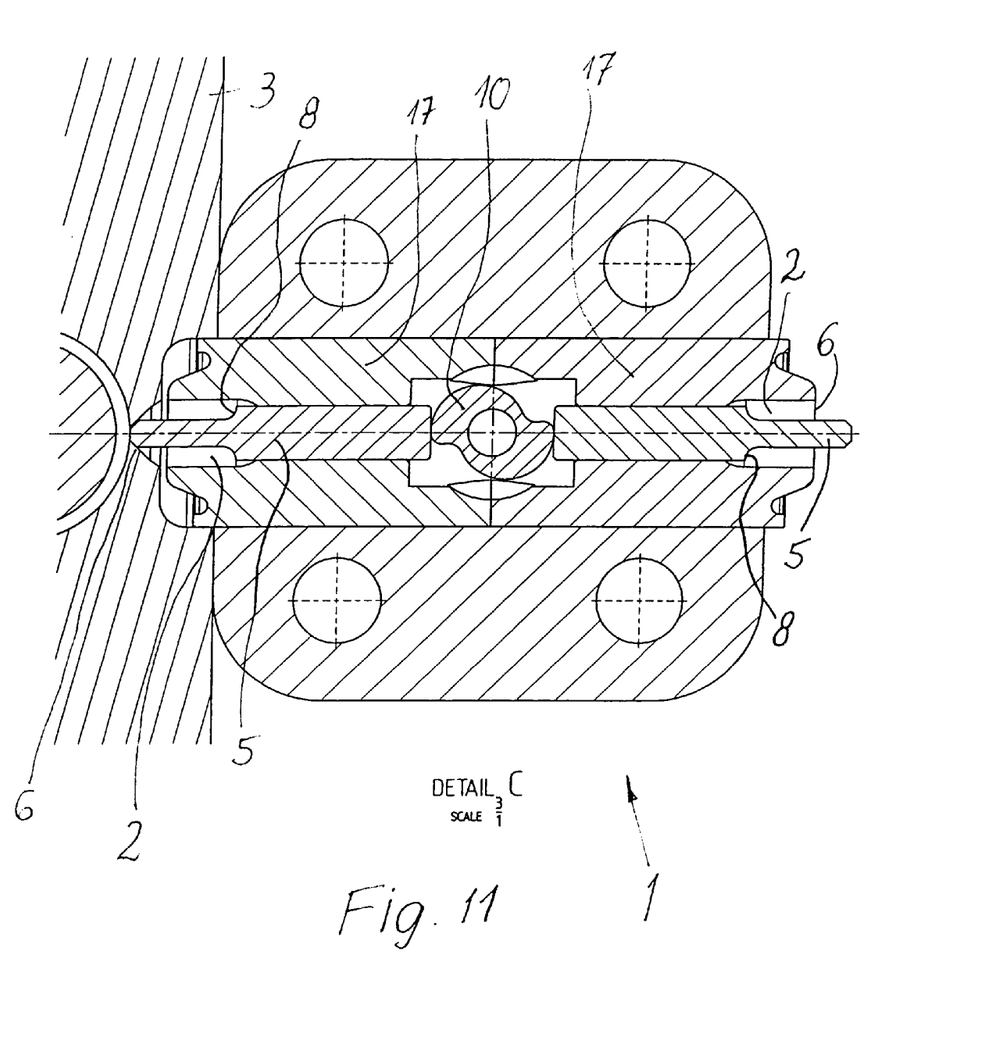
FIG. 11 shows, in an enlarged diagram, the closure needles with the eccentric disk arranged between their ends according to FIGS. 9 and 10, in the closed position.

According to FIGS. 6-11, the displacement body can however be a cam disk or eccentric disk 10, whose periphery changes from a smaller to a larger dimension and back again. In this case, to close the closure needles, this disk is to be turned from the position shown in FIG. 6, for example clockwise, in order to reach the closing position shown in FIGS. 8 and 11. FIGS. 9 and 10 also show such a closing position of the closure needles 5.

Figure 1:
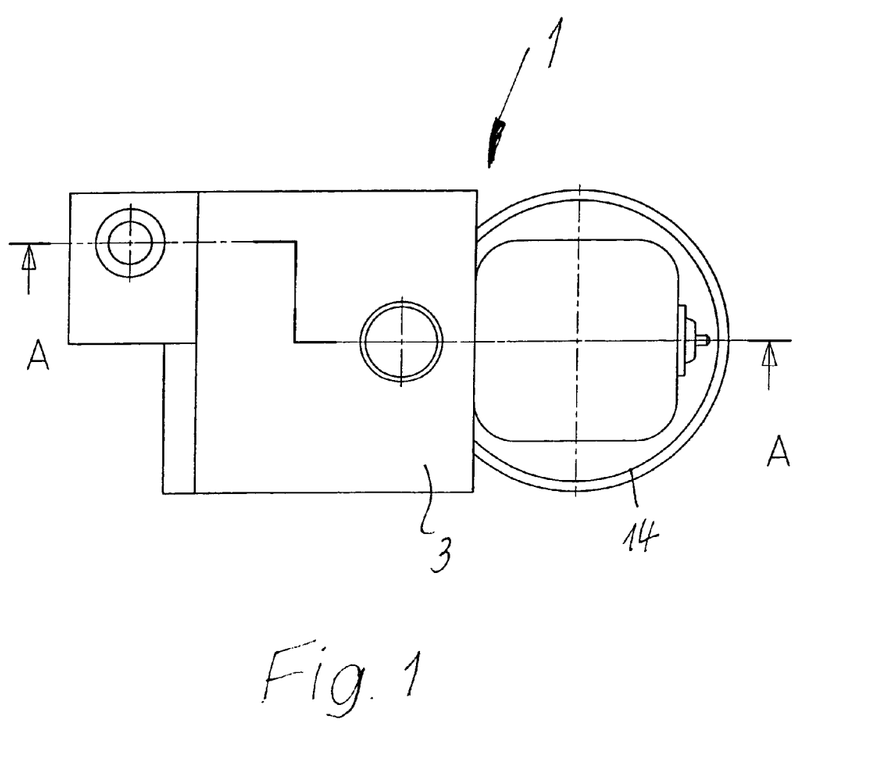
FIG. 1 shows a view of an injection molding nozzle according to the invention in connection with a mold on which it is to act.
Figure 2:
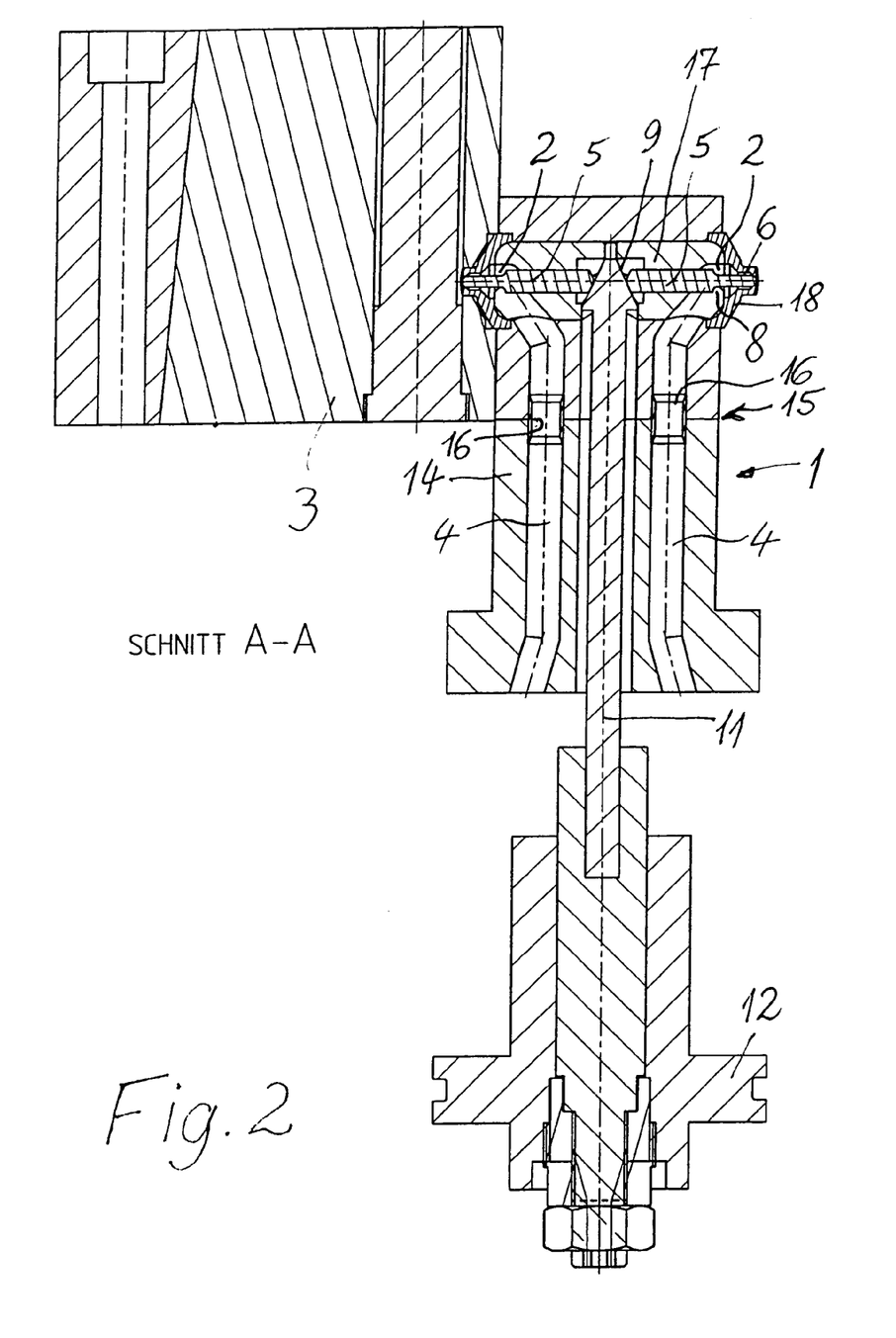
FIG. 2 shows a longitudinal section of an exemplary embodiment of the injection molding nozzle according to the invention along the line A-A in FIG. 1, wherein a respective closure needle is arranged in each of the outlet openings directed away from each other, and the closure needles are displaced out of an open position into the closing position shown by a cone member engaging simultaneously on their mutually facing ends.
Figure 3:
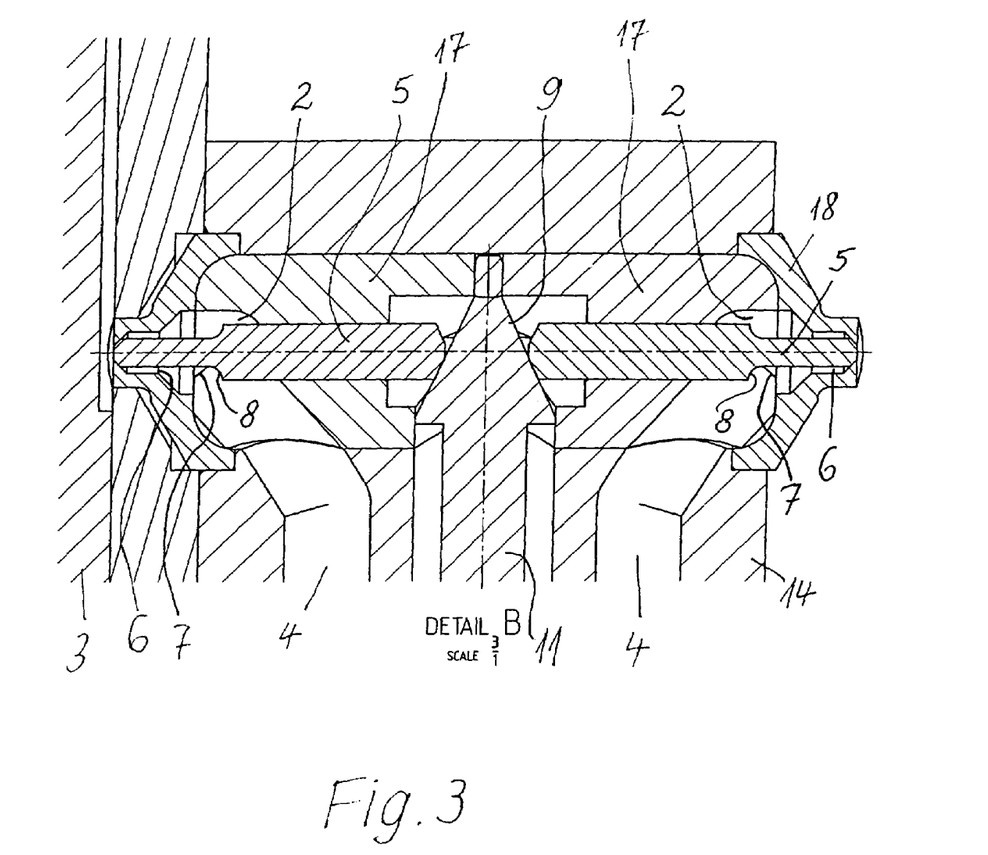
FIG. 3 shows on an enlarged scale the closure needles and the cone body acting on both of them, in the closing position, the mouths of the outlet openings being formed by separate caps fastened to the nozzle housing.
Figure 4:
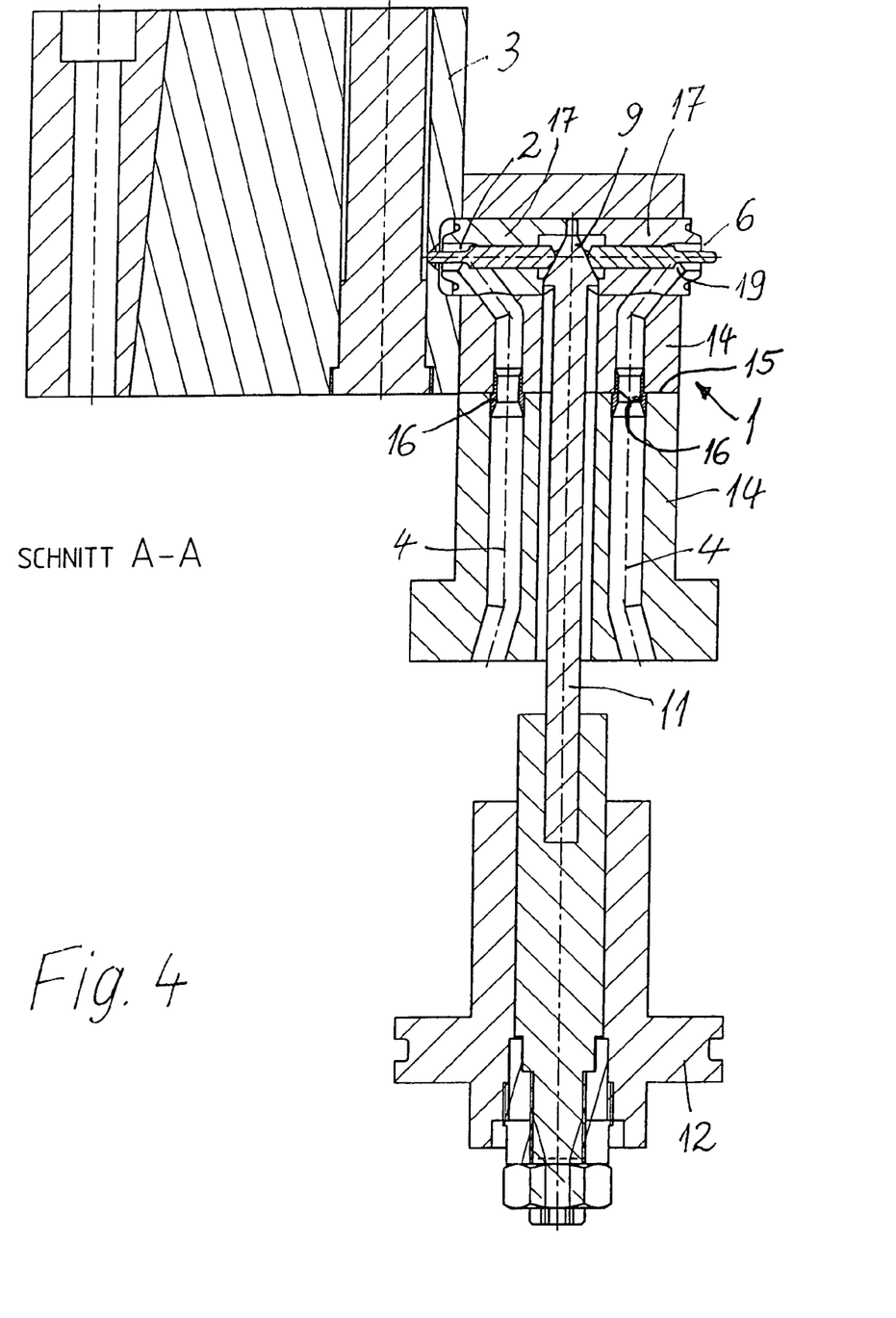
FIG. 4 shows a longitudinal section, also taken along the line A-A in FIG. 1, of a modified embodiment, in which the mouths which can be wholly or partially closed by the closure needles are machined into the respective mold.
Figure 5:
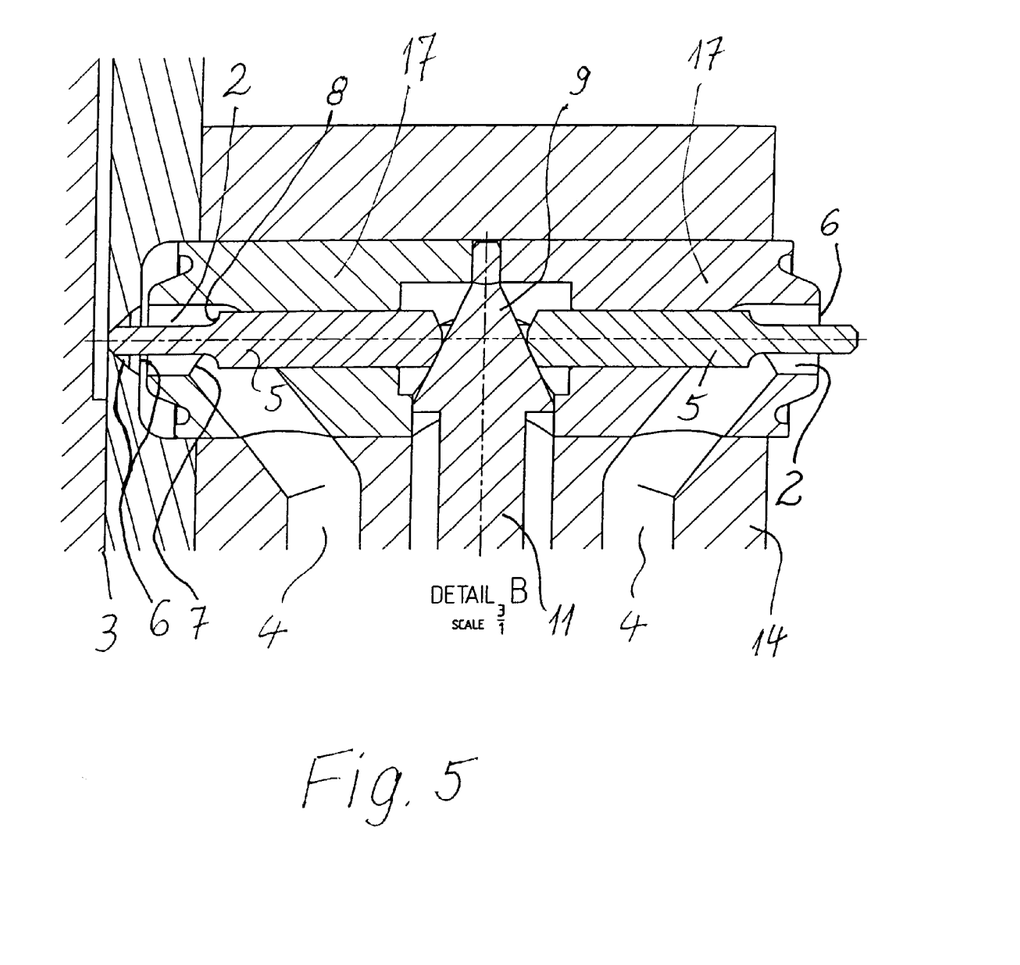
FIG. 5 shows an enlarged diagram of the closure needles according to FIG. 4.
Figure 6:
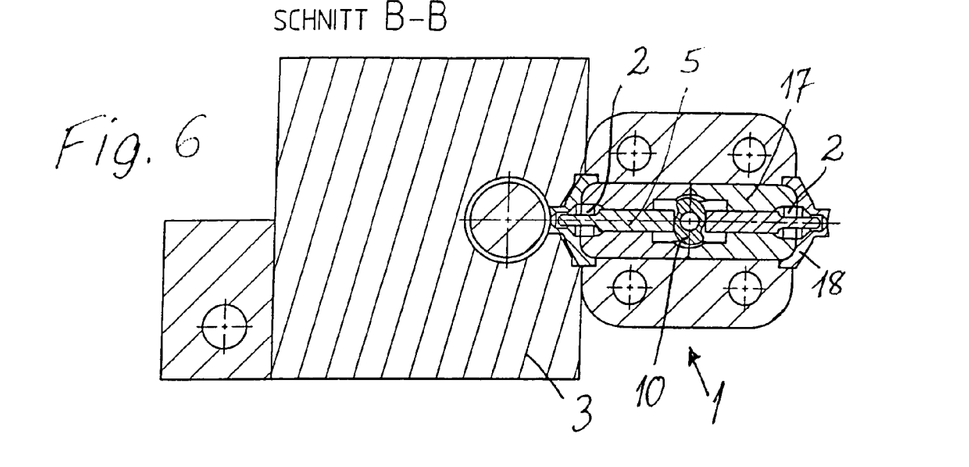
FIG. 6 shows a cross section along the line B-B in FIG. 7
Figure 7:
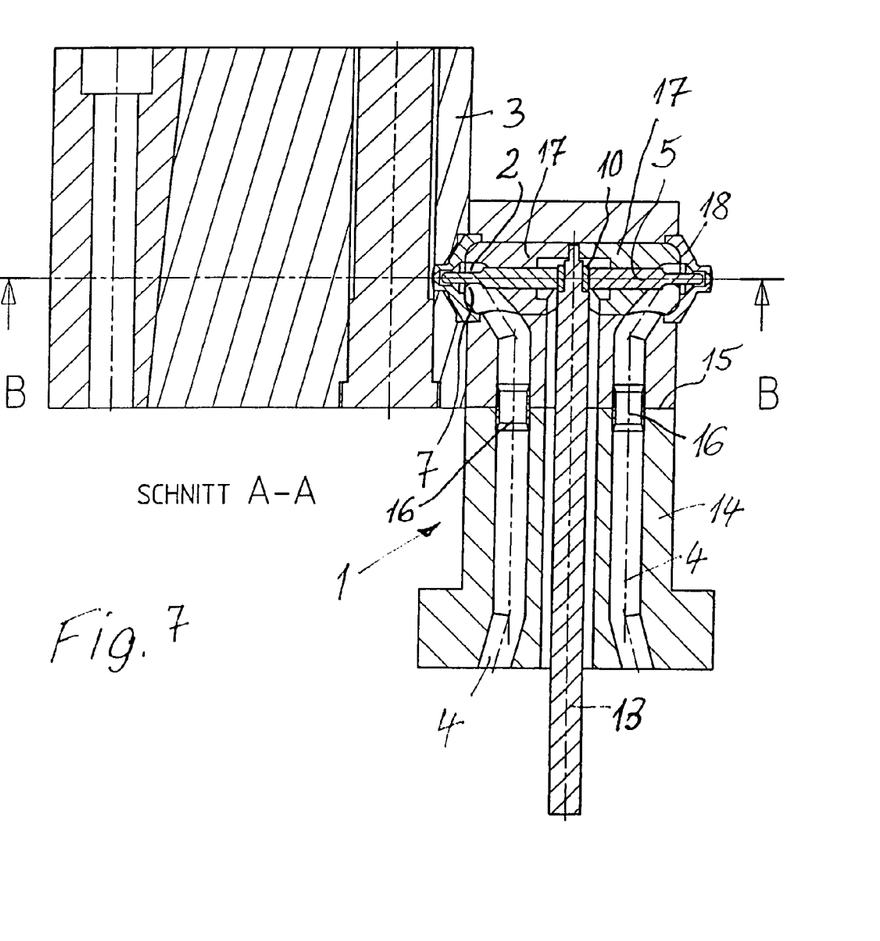
FIG. 7 shows a longitudinal section also taken along the line A-A in FIG. 1, relating to an embodiment in which a cam disk acted on by a rotary rod is arranged between the ends of the closure needles, the closure needles being situated in the opening position and the outlet openings being arranged in a separate cap.
Figure 8:
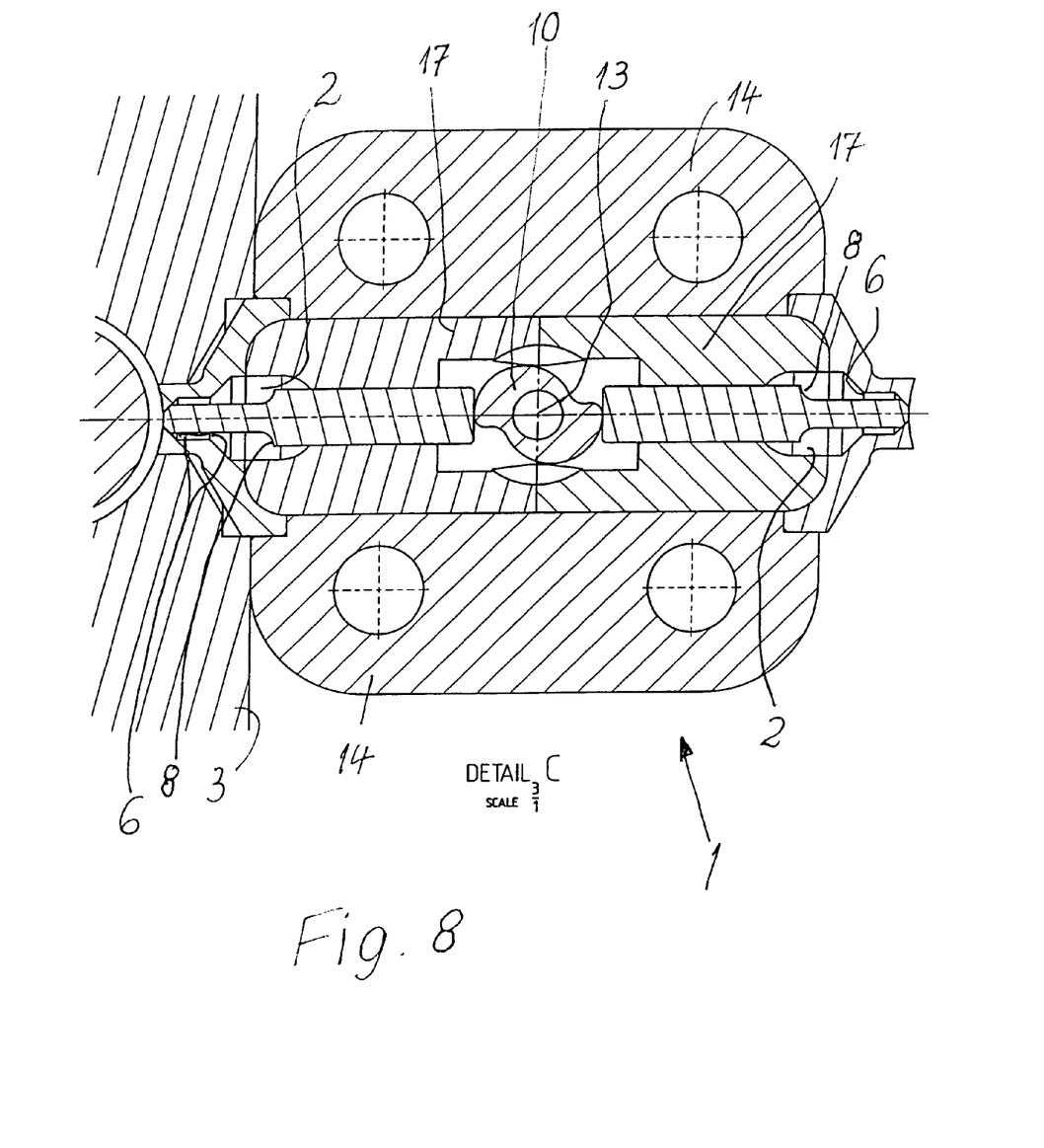
FIG. 8 shows an enlarged diagram of the closure needles according to FIGS. 6 and 7, in the closing position.

For displacing the conical or cone-shaped member 9 there is provided, according to FIGS. 2-5, a push/pull rod 11, displaceable in the axial direction centrally within the injection molding nozzle 1, with a piston 12 engaging its end according to FIGS. 2 and 4 and displaceable back and forth acted on by a pressure medium, in a cylinder, not shown in detail, in order to correspondingly displace the rod 11 and the cone 9 situated thereon. However, any suitable optional drive element can engage on this rod 11.

For rotating the cam disk or eccentric disk 10, a rotary rod 13 acts which is arranged centrally in the injection molding nozzle 1 and which can be engaged by a corresponding rotary drive of optional construction.

In all the exemplary embodiments it is provided that the housing 14 of the injection molding nozzle is divided transversely of the feed channels 4 and has a thermal compensation gap 15 in the region of the division. It can thereby be attained that thermal movements are taken up by this thermal compensation gap 15, and the closure needles 5 thus maintain their precise position in spite of such thermal movements and also are not loaded by thermal stresses.

The thermal compensation gap 15 is sealed in the housing 14, at least in the region of the feed channels 4, and indeed in that sliding sleeves 16 are arranged in the region of the feed channels 4 on the outer side or, according to the embodiment examples, in the interior of the respective feed channel 4. It is thereby ensured that in spite of this thermal compensation gap 15 the injection molding material cannot escape from the feed channels 4.

The outlet openings 2 and the closure needles 5 displaceable therein are arranged, in all the embodiment examples, in interchangeable sleeves 17 which are inserted—preferably interchangeably—in the housing 14 of the injection molding nozzle 1. This facilitates the mounting of above all the closure needles 5 also and their replacement in case of wear.

The closure needles 5 can however also be axially introduced from outside into their mounting position situated in the sleeves 17 and can be fixed by means of a retaining cap 18 which can be screwed onto the outside and has the mouth 6 of the outlet opening 2. This arrangement can be seen in FIGS. 2-3 and in FIGS. 6-8. In the other embodiments, on the other hand, such a retaining cap 18 is not provided and the opening corresponding to the mouth 6 is transferred to the mold 3 into which the corresponding closure end of the closure needle 5 is displaceable.

The retaining cap 18 here has yet another function, in that namely it could prevent the closure needle 5 at its cross sectional enlargement 8 from an undesired escape from its mounting, while in the embodiments without such a retaining cap 18, a corresponding counter-stop 19 for the cross sectional enlargement 8 could be provided. In both cases, the closure needle 5 is thus fixed in its axial direction such that the displacement movement is limited to the closing direction and the closure needle 5 is delimited in the radial direction.

In the exemplary embodiments, respectively two oppositely oriented closure needles 5 are provided; however, more such closure needles 5, for example, three or four closure needles 5, could be provided in the same nozzle housing 14 and also in the same plane, and be respectively acted on by the same drive element, insofar as space permits at the mutually facing ends of the closure needles 5.

The injection molding nozzle 1 for plastic, with at least two outlet openings 2 on different sides and in facing in opposite directions, is not constructed as an open injection molding nozzle, but has a respective closure needle 5 in the outlet openings 2, a drive being provided for the closure needle 5 at least into the closing position. Thus, a cold plug at the end of the outlet openings 2 facing a mold 3 can be avoided, independently of whether the closure needles completely close these outlet openings 2 at their mouth 6 or still leave a minimum gap.

The invention claimed is:

1. Injection molding nozzle (1) for plastic comprising:
   at least one pair of outlet openings (2) disposed opposite one another relative to a center axis in an end region of the injection molding nozzle directed toward different sides of the nozzle (1), for discharging to different sprue openings, each of the outlet openings (2) including a needle closure with a closure needle (5) adjustable in a direction of one of the outlet openings (2);
   a common drive element for displacing the closure needles (5) in a closing direction, the drive element being a displacement member movable between rear ends of the closure needles (5), and the drive element including a cross section that is at least one of a cone (9), conical, tapered, a cam disk and an eccentric disk (10); and
   a feed channel (4) for transporting plastic to the outlet openings (2), the feed channel closeable by the drive element when displacing the closure needles.

2. Injection molding nozzle according to claim 1, wherein, the feed channel (4) comprises a separate feed channel for the plastic for each of the outlet openings (2) provided with a closure needle (5), and the feed channels (4) are arranged outside a middle area of the injection molding nozzle (1).

3. Needle closure nozzle according to claim 1, wherein the feed channels (4) for the plastic enter the outlet openings (2) before mouths (6) thereof, near ends of the individual closure needles (5).

4. Injection molding nozzle according to claim 1, wherein the outlet openings (2) and the closure needles (5) displaceable into them are arranged approximately radially and generally in one plane extending perpendicularly to a longitudinal mid-axis of the injection molding nozzle (1).

5. Injection molding nozzle according to claim 1, wherein the closure needles (5) of the outlet openings (2) have a common drive for displacement into the closing position.

6. Injection molding nozzle according to claim 1, wherein the closure needles (5), in a closing direction, have a cross section enlargement (8) or a shoulder located before the feed channel (4) entry for the plastic as an action surface for injection molding pressure for opening the closure needle (5), and the drive acting in the closing direction can be disconnected and/or overcome during opening of the respective closure needle (5).

7. Injection molding nozzle according to claim 6, wherein compression springs and/or displacement means engaging mechanically on the closure needles (5) are provided for displacing the closure needles (5) into the closing position and are located at ends remote from the outlet opening.

8. Injection molding nozzle according to claim 1, wherein for displacing a conically shaped or cone (9) displacement member, a push/pull rod (11) displaceable in an axial direction is located centrally within the injection molding nozzle (1), or for rotating a cam disk or eccentric disk (10) a rotary rod (13) is provided centrally in the injection molding nozzle (1).

9. Injection molding nozzle according to claim 1, wherein a drive element engaging the closure needles (5) is coupled and connected with the closure needles such that one movement serves for closing and an opposite movement serves for pulling back the closure needles (5) into an opening position.

10. Injection molding nozzle according to claim 1, further comprising a housing (14) that is divided perpendicularly to the feed channels (4) for the plastic and has a thermal compensation gap (15) in a region of the division.

11. Injection molding nozzle according to claim 10, wherein the thermal compensation gap (15) on the housing (14) of the injection molding nozzle is sealed by an overlap at least in a region of the feed channels (4) for the plastic.

12. Injection molding nozzle according to claim 11, wherein the overlap serving for sealing the thermal compensation gap (15) in the region of the feed channels (4) is formed by a sliding sleeves (16) or a respective sliding sleeve (16) arranged on an inside or outside of the feed channel (4).

13. Injection molding nozzle according to claim 1, wherein a rod (11, 13) arranged in a center of the nozzle housing (14) for a common drive of the closure needles (5) is provided or coupled with a rotary or axial drive.

14. Injection molding nozzle according to claim 1, wherein the outlet openings (2) and the closure needles (5) displaceable therein are arranged in bushings inserted into a housing (14) of the injection molding nozzle (1).

15. Injection molding nozzle according to claim 1, further comprising at least one retaining cap (18) removably threadably secured to an outside of the injection molding nozzle which retains at least one of the closure needles (5), the retaining cap (18) including a mouth (6) of the outlet opening (2).

16. Injection molding nozzle according to claim 1, further comprising a bushing (17) which receives the closure needles (5) in the nozzle body, and at least one of the closure needles includes a shoulder or a cross section enlargement which limits movement of the at least one of the closure needles in an axial direction.

17. Injection molding nozzle according to claim 1, wherein more than two outlet openings with closure needles (5) displaceable therein are arranged on one nozzle housing (14), and are movable in the closing direction with the same drive element.

18. Injection molding nozzle (1) for plastic comprising:
first and second openings (2) in an end region of the injection molding nozzle directed radially outwardly opposite one another from a center axis of the nozzle and toward opposite sides of the nozzle (1) for discharging to different sprue openings;
first and second closure needles (5), the first closure needle positioned in the first opening and the second closure needle positioned in the second opening;
a common drive element for displacing the first and second closure needles (5) in a closing direction, the drive element being a displacement member movable between ends of the closure needles (5) and slideably connected to an end of each of the first and second closure needles; and
a feed channel (4) for transporting plastic to the outlet openings (2) the feed channel closable by the drive element when displacing the closure needles.

19. The injection molding nozzle according to claim 18, wherein a push/pull rod (11) is connected to the displacement member for actuating the displacement member.

20. The injection molding nozzle according to claim 18, wherein a rotary rod (13) is connected to the displacement member for actuating the displacement member.

21. Injection molding nozzle (1) for plastic comprising:
first and second openings (2) in an end region of the injection molding nozzle, for discharging to different sprue openings disposed opposite one another relative a center axis;
first and second closure needles (5), the first closure needle positioned in the first opening and the second closure needle positioned in the second opening;
a common drive element for displacing the first and second closure needles (5) in a closing direction, the drive element being a displacement member movable between ends of the closure needles (5) and slideably connected to each of the first and second closure needles; and
a feed channel (4) for transporting plastic to the outlet openings (2) the feed channel closeable by the drive element when displacing the closure needles.

\* \* \* \* \*